United States Patent [19]

Chevakin et al.

[11] Patent Number: 5,012,649
[45] Date of Patent: May 7, 1991

[54] POWER ACTUATOR

[76] Inventors: Ivan V. Chevakin, 2-proezd Metallurgov, 2, korpus 2, kv. 5; Nikolai P. Zharov, ulitsa Michurina, 143, kv. 8, both of Tula; Oleg V. Popov, Sokolnichesky val, 24, korpus 1, kv. 134, Moscow; Abram I. Pesin, ulitsa Levy bereg Oki, 57, kv. 20, Orel; Petr A. Radchenko, ulitsa Kharkovskaya, 3, korpus 4, kv. 27, Moscow, all of U.S.S.R.

[21] Appl. No.: 460,952
[22] PCT Filed: Jul. 25, 1988
[86] PCT No.: PCT/SU88/00141
   § 371 Date: Feb. 28, 1990
   § 102(e) Date: Feb. 28, 1990
[87] PCT Pub. No.: WO90/01116
   PCT Pub. Date: Feb. 8, 1990

[51] Int. Cl.⁵ .............................. F03G 7/06
[52] U.S. Cl. ...................................... 60/527
[58] Field of Search .................. 60/527, 528, 529

[56] References Cited
U.S. PATENT DOCUMENTS
4,031,704 6/1977 Moore et al. ...................... 60/527

Primary Examiner—Allen M. Ostrager
Attorney, Agent, or Firm—Burgess, Ryan & Wayne

[57] ABSTRACT

A power actuator comprises an enclosure (5) separated by transverse partitions (6) into two sections (7, 8) which are filled in succession with a heat-transfer agent. A load-bearing casing (1) the walls of which are made of a material possessing a "form-remembering" ability is arranged along the longitudinal axis of the enclosure (5). At a definite temperature the walls of the load-bearing casing (1) deflect inwardly, thereby reducing the internal volume of the load-bearing casing (1). The transverse partitions are made of an elastic material and are installed for coming in contact with the external surfaces of the walls of the casing (1) when their position is changed.

1 Claim, 1 Drawing Sheet

POWER ACTUATOR

TECHNICAL FIELD

The present invention relates to the mechanical engineering and, more particularly, to a power actuator.

BACKGROUND OF THE INVENTION

Known in the prior art is a device for destruction of rocks by expensive forces (SU, A, No. 691,564) the power actuator of which comprises a casing filled with a working medium, for example, water and is made up of two portions the walls of one of which are provided with perforations in the form of grooves, and an enclosure disposed on one of the casing portions and adapted to be moved onto the other portion of the casing. Recesses of the load-bearing casing internally accommodate wedge-shaped elastic expanding elements. After the enclosure is installed on that portion of the casing which is made with perforations, it is filled with a refrigerating agent, for example, carbon dioxide. The working medium disposed in this portion of the casing is subjected to freezing. After the enclosure is shifted onto the other portion of the casing the working medium is frozen in this portion to a temperature of $-25°$ C. and down. After the device is introduced in a blasthole of the monolith to be destroyed the working medium temperature is brought up to $-14°$ C. and upward at which it becomes fluid. Passing under a pressure in the grooves made in the walls of the casing the working medium acts on the wedge-shaped elastic expanding elements which exert pressure on the blasthole wall, thereby destroying the monolith.

The power actuator of the given design fails to develop sufficiently great expansive forces and is not convenient in operation because of the movable enclosure due to which the field of its application is limited.

Also known in the prior art is a power actuator (SU, A No. 810,340) operating at the expense of energy of an expanding working medium and comprising a load-bearing casing filled with the working medium and arranged along the longitudinal axis of a multi-section enclosure, The enclosure is separated by rigid transverse partitions into sections communicated with one another by means of connections through which the enclosure sections are supplied with a heat-transfer agent, for example, hot water at a temperature of $80°$-$90°$ C. for heating the working medium, for example, a mixture containing 50% of paraffin and 50% of stearin, or cold water water at a temperature of $10°$ C. for cooling the working medium.

One end of the load-bearing casing is made blind and its opposite end is connected with an actuating member, for example, with a perforating press. The section-by-section filling of the enclosure with the heat-transfer agent insures the step-by-step expansion of the working medium which makes it possible to regulate the forces transmitted to the actuating member by way of gradually heating the load-bearing casing.

The pressure exerted on the actuating member and consequently the travel of the actuating member working tool are defined by the amount of the working medium increased in volume due to expansion. In order to obtain in the power actuator of the known design an additional force to be transmitted to the actuating member, it is necessary to increase the mass of the working medium and, consequently, to enlarge the overall dimensions of the load-bearing casing and hence of the enclosure which reduces the efficiency of the power actuator operation.

SUMMARY OF THE INVENTION

The invention is essentially aimed at providing a power actuator wherein a design embodiment of the load-bearing casing and the enclosure at the expense of providing an additional force will insure a positive displacement of the working medium which in turn will allow a substantial increase of the force transmitted from the working medium to the actuating member along with a decrease in the overall dimensions and metal content of the power actuator.

This is attained by a power actuator comprising an enclosure separated by tranverse partitions into intercommunicated sections filled with a working medium and internally accommodating along its axis a load-bearing casing one end of which is to be connected with an actuating member and its opposite end is made blind, according to the invention, walls of the load-bearing casing are made of a material possessing a "form-remembering" ability providing such a position of the casing walls in which the internal volume of the load-bearing casing is reduced, the transverse partitions of the enclosure being made of an elastic material and installed for coming in contact with the load-bearing casing walls when their position is changed.

The present invention ,makes it possible to increase the force transmitted from the power actuator to the actuating member and to step up the operating efficiency of the device operating at the expense of energy of the expanding working medium.

BRIEF DESCRIPTION OF DRAWINGS

The invention will now be described in greater detail with reference to a specific embodiment thereof taken in conjunction with the accompanying drawings, wherein.

BEST MODE FOR CARRYING OUT THE INVENTION

Figure 1:
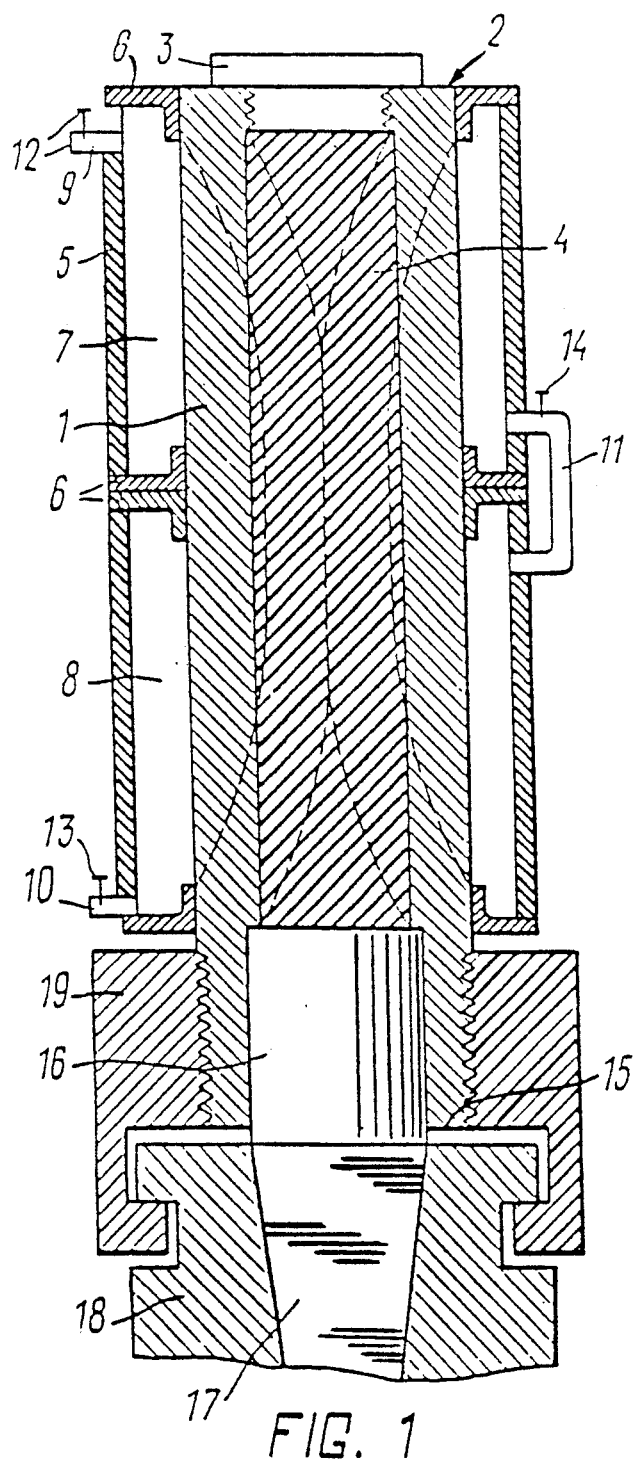
FIG. 1 is a general view of the power actuator with an actuating member used for destruction of a monolith, according to the invention.

A power actuator, according to the invention, comprises a hollow load-bearing casing 1 (FIG. 1) the walls of which are made of a material possessing a "form-remembering" ability, for example, nitinol, an alloy of nickel and titanium. One of the ends of the casing 1, for example, an end 2 has a quick-detachable blank cover 3. The casing 1 is filled with a working medium and is arranged in an enclosure 5 along the longitudinal axis thereof. The enclosure 5 is separated by transverse partitions 6 into two sections 7 and 8. The partitions 6 are made of an elastic material, for example, rubber and their internal surfaces are adapted to be kept in constant with the external surfaces of the casing 1. The enclosure 5 incorporates a connection 9 for intake of a heat-transfer agent, for example, water, a connection 10 for discharge of the heat-transfer agent and a connection 11 by means of which the sections 7 and 8 are intercommunicated. The connections 9, 10 and 11 are provided with shut-off valves 12, 13 and 14 respectively.

Figure 2:
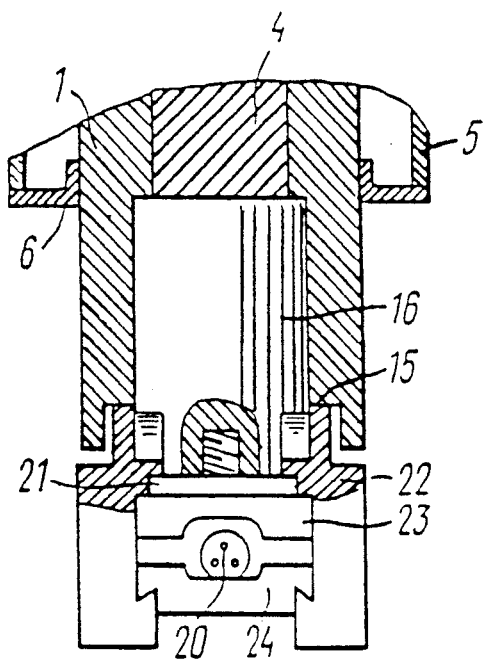
FIG. 2 illustrates an embodiment of the association of the power actuator with the actuating member used for plastic working or parts, according to the invention.

An end 15 of the casing 1 opposite the end 2 is designed for associating the power actuator with an actuating member. On the side of the open end 15 the working medium 4 cooperates with the actuating member which when the power actuator is used in rock quarries for breaking large monoliths off the rock mass along the line of blastholes followed by disintegration of monoliths into blocks, is provided with a piston 16 (FIGS. 1 and 2) coupled with a wedge 17 (FIG. 1) associated with an expanding element 18 secured by means of a holder 19 to the lower end 15 of the casing 1.

If the actuating member is used for a cold welding of parts 20 (FIG. 2) the piston 16 is associated through a step bearing 21 with a punch 22 and the lower end 15 of the casing 1 is associated by means of a hoop 23 with a die 24.

The casing 1 (FIG. 1), the walls of which at a preset temperature will deflect inwardly, thereby reducing the internal volume of the casing 1, is provided with walls made of nitinol, said casing is heated to a temperature of 80° C. and the casing walls are pressed inwardly. Thereafter the casing 1 is cooled and its original form is restored.

The proposed power actuator operates in the following way.

After removal of the blank cover 3 (FIG. 1) the internal space of the hollow casing 1 is filled with the working medium 4 which is essentially a mixture containing 50% of paraffin and 50% of stearin in the state of a solid aggregate in the form of pressed rod. Then the casing 1 is closed with the blank cover 3. The heat-transfer agent, for example, water heated to a temperature of 80°-90° C. is delivered through the connection 9 until the section 7 of the enclosure 5 is completely filled. Then, after the opening of the shut-off valve 14 the water at the same temperature is delivered through the connection 11 until the section 8 is completely filled. The step-by-step filling of the enclosure 5 with hot water insures a gradual heating of the working medium 4 which when changing from the solid aggregate state into the liquid state expands and increases in volume by 13-15%. As a result, it acts on the piston 16 with a pressure over 200 MPa. The hot liquid working medium 4 and the hot water in the enclosure 5 heat the walls of the casing 1 up to a temperature of 80° C. As the walls of the casing 1 are made of the material possessing a "form-remembering" ability they deflect inwardly at this temperature, reducing the internal volume of the casing 1, forcing an additional volume of the working medium 4 therefrom and thus developing an additional force transmitted to the piston 16. The piston 16 actuates the wedge 17 which cooperates with the expanding elements 18. When the actuating member is introduced in a blasthole the expanding elements exert pressure on the blasthole walls, thereby breaking the rock mass.

When the actuating member is used for a cold welding of the parts 20 (FIG. 2) the force developed by the working medium 4 is transmitted to the piston 16, further to the punch 22 through a step bearing 27, and also to the die 24 with the hoop 23. Thus, the cold welding of the parts 20 is accomplished.

The use of the proposed power actuator makes it possible to develop an additional force along with a decrease of the overall dimensions and metal content of the power actuator. This makes it possible to widen the field of the power actuator application and to improve the reliability of the devices operating at the expense of energy of an expanding medium.

INDUSTRIAL APPLICABILITY

The present invention may be most advantageously used in mining and construction for working rock quarries by way of breaking large monoliths off the rock mass along the line of blastholes followed by disintegration of monoliths into blocks, for weakening a difficult-to-collapse roof, for mining of stratified deposits, for fracturing of oil reservoirs and gas-bearing strata, for destruction of concrete and reinforced-concrete foundations of old constructions. In the mechanical engineering and metal working industry the present invention may be used as a powerful small-size power actuator for presses, jacks guillotines, expanders for tubes of heat exchangers and other devices requiring substantial directed forces.

What is claimed:

1. A power actuator comprising:
   an enclosure having an inner cavity extending in the direction of the longitudinal axis of the enclosure;
   transverse partitions made of an elastic material operatively engaged to the enclosure and adapted to divide the inner cavity into intercommunicated sections for receiving a source of thermal energy;
   a load-bearing casing within said enclosure and extending along the longitudinal axis of said enclosure, said casing comprising;
   walls defining a chamber containing a working medium,
   an open end adapted to receive an actuating member into said chamber for interacting with said working medium;
   said walls made of a shape-memory material which when subject to said thermal energy are adapted to reduce the space of the chamber forcing the working medium to exert a force on said actuating member.

* * * * *